(12) United States Patent
Siekman et al.

(10) Patent No.: US 11,934,447 B2
(45) Date of Patent: Mar. 19, 2024

(54) AGNOSTIC IMAGE DIGITIZER

(71) Applicant: Bank of America Corporation, Charlotte, NC (US)

(72) Inventors: James Siekman, Charlotte, NC (US); Aubrey Breon Farrar, Sr., Waldorf, MD (US); Mohamed Faris Khaleeli, Charlotte, NC (US); Patricia Ann Albritton, Charlotte, NC (US); Sheila Page, Charlotte, NC (US); Mark Alan Odiorne, Waxhaw, NC (US); Marcus R. Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 42 days.

(21) Appl. No.: 17/861,379

(22) Filed: Jul. 11, 2022

(65) Prior Publication Data

US 2024/0012848 A1    Jan. 11, 2024

(51) Int. Cl.
*G06F 7/00* (2006.01)
*G06F 16/25* (2019.01)
*G06F 16/51* (2019.01)
*G06F 40/103* (2020.01)
*G06F 40/123* (2020.01)
*G06F 40/174* (2020.01)
*G06V 30/19* (2022.01)

(52) U.S. Cl.
CPC ............ *G06F 16/51* (2019.01); *G06F 16/258* (2019.01); *G06F 40/103* (2020.01); *G06F 40/123* (2020.01); *G06F 40/174* (2020.01); *G06V 30/19* (2022.01); *G06V 2201/10* (2022.01)

(58) Field of Classification Search
CPC ...... G06F 16/51; G06F 16/258; G06F 40/103; G06F 40/123; G06F 40/174; G06V 30/19; G06V 2201/10
See application file for complete search history.

(56) References Cited

U.S. PATENT DOCUMENTS

| | | | | |
|---|---|---|---|---|
| 7,934,217 | B2 * | 4/2011 | Reddy | H04N 1/00204 719/311 |
| 7,979,793 | B2 * | 7/2011 | Miller | G06F 40/143 715/255 |
| 9,665,628 | B1 * | 5/2017 | Dubey | G06N 7/01 |
| 10,049,096 | B2 * | 8/2018 | Deepak | G06V 10/22 |
| 10,817,571 | B2 * | 10/2020 | McCaffrey | G06F 16/93 |
| 11,526,261 | B1 * | 12/2022 | Leach | G06F 3/0484 |

(Continued)

*Primary Examiner* — Mohammed R Uddin
(74) *Attorney, Agent, or Firm* — Weiss & Arons LLP

(57) ABSTRACT

Methods for enhancing compatibility of a document of an entity with an organization's database on a computer server. Methods may include using a computer hardware processor to digitize a document from a first format into a digital format, such as bytes, when the first format may not be compatible with the database. Methods may further include using a computer hardware processor to convert the document from a digital format into a second format, where the second format of the document may be compatible with the organization's database. Methods may include using a computer hardware processor to populate the database on the computer server with data from the document in the second format. Methods may further include storing the populated database and the document in the second format on the computer server.

8 Claims, 9 Drawing Sheets

(56) References Cited

U.S. PATENT DOCUMENTS

| | | | | |
|---|---|---|---|---|
| 11,631,266 B2* | 4/2023 | Sampath | ............... | G06V 30/412 |
| | | | | 382/157 |
| 11,775,889 B2* | 10/2023 | Martin, Jr. | ............. | G06Q 50/01 |
| | | | | 705/7.11 |
| 11,789,592 B1* | 10/2023 | Fehlman, II | ............ | G06F 16/34 |
| | | | | 715/738 |
| 11,790,388 B2* | 10/2023 | Zanoon | ................... | G06N 3/02 |
| | | | | 705/14.23 |
| 2004/0003353 A1* | 1/2004 | Rivera | .................. | G06Q 10/10 |
| | | | | 715/255 |
| 2004/0010521 A1* | 1/2004 | Li | ........................ | G06F 16/258 |
| 2005/0223109 A1* | 10/2005 | Mamou | ..................... | G06F 7/00 |
| | | | | 707/999.101 |
| 2010/0088587 A1* | 4/2010 | Ding | .................... | G06F 40/197 |
| | | | | 715/229 |
| 2016/0224516 A1* | 8/2016 | Clar | ....................... | G06Q 10/10 |
| 2017/0235735 A1* | 8/2017 | Ignatyev | ................ | G06Q 10/00 |
| | | | | 706/12 |
| 2018/0075138 A1* | 3/2018 | Perram | ................... | G06F 16/93 |
| 2019/0102342 A1* | 4/2019 | Wang | ....................... | G06F 7/14 |
| 2020/0151591 A1* | 5/2020 | Li | ............................. | G06N 3/08 |
| 2021/0192412 A1* | 6/2021 | Krishnaswamy | ............................. | |
| | | | | G06Q 10/06375 |
| 2021/0271665 A1* | 9/2021 | Jetzfellner | .......... | G06F 16/2379 |
| 2021/0318891 A1* | 10/2021 | Purkait | ..................... | G06F 8/35 |
| 2022/0012406 A1* | 1/2022 | D'Oria | .................... | G06V 30/10 |
| 2023/0005075 A1* | 1/2023 | Li | ......................... | G06N 3/096 |
| 2023/0315799 A1* | 10/2023 | Belhe | .................... | G06V 30/18 |
| | | | | 715/206 |

* cited by examiner

AGNOSTIC IMAGE DIGITIZER

FIELD OF TECHNOLOGY

Aspects of the disclosure relate to extending the usable lifetime of a database. Aspects of the disclosure relate to digitizing an image to make it compatible with a database.

BACKGROUND OF THE DISCLOSURE

Organizations rely on computer programs to perform their daily operations. Many times, these systems are not able to cope with the adoption of modern technologies. Technology is constantly advancing and new ways for entities to provide input to organizations are changing. The formats of these inputs are also constantly changing over time.

Organizations invest significant resources of money, time, and training to bring on new systems for managing their daily operations. Without these systems performing as intended, organizations would find it difficult to operate, and would eventually cease to exist as a viable entity. Organizations often have systems that were created ten, twenty, or even thirty years ago. While old, they still perform critical functions for the organization that allow the organization to continue to function.

Frequently, an organization is reluctant to replace an existing system that is critical to the organization's operations. Two of the primary considerations are as follows. First, the cost to replace the system may be materially greater than the cost to continue to operate it, even with various patches implemented to keep it going. Second, the requirement of concerned stakeholders such as auditors and regulators to certify that a new system operates with sufficient confidence. This duality may result in a significant investment to overhaul a legacy system only to have the new system fail to achieve the auditor's and regulator's requirements, leading to a significant loss of money and time without the necessary permission to implement the new system.

There is a need to extend the usable lifetime of an organization's database such as a legacy database.

There is a further need to enhance an entity's user experience by making documents the entity submits usable by an organization's legacy database without requiring an altered submission by the entity.

There is an additional need to extract data in a legacy database to provide a dataset for training a statistical model.

There is a need to use a statistical model to aid an entity providing an organization with submissions.

The is a further need to facilitate continual improvement of a statistical model.

SUMMARY OF THE DISCLOSURE

It is an object of the invention to extend the usable lifetime of an organization's database, such as a legacy database. Digitizing documents currently stored in an organization's database in a non-digital format, such as a picture, scan, or facsimile, may contribute to achieving this objective. Adding the data to a more state-of-the-art database may facilitate the organization's ability to implement tools, such as statistical models, to enhance an entity's user experience. The statistical model may be an artificial intelligence (AI) tool, such as a machine learning AI system or a deep learning AI system, which facilitates learning from a legacy database to enhance an entity's user experience.

It is a further object of the invention to enhance an entity's user experience by making documents of one format compatible with databases of other formats. In this aspect, the database may be a more current database including a state-of-the-art database. This object may allow for an entity to submit documents in a format that is not currently compatible with an organization's database. Digitizing submitted documents may facilitate adding data from submitted documents into the state-of-the-art database. Submissions may include pictures, scans, facsimile, and the like.

It is an additional objective of the invention to facilitate the extraction of data and metadata in a legacy database to provide a dataset for training a statistical model. Accessing data and metadata from a legacy database may include digitizing entries in the database, which may facilitate analysis of the data and metadata with less manual intervention.

It is an objective of the invention to use a statistical model to aid an entity in providing an organization with submissions, such as aiding in completing a document. This may include pre-populating fields in a document that the entity seeks to complete. This may include predicting a type of document sought by an entity based on preliminary information provided by the entity.

It is a further object of the invention to provide continual improvement to a statistical model. Using past and future data and metadata from documents submitted by an entity may allow an organization to develop and continually update a statistical model. This may include obtaining additional input from an entity to help improve the accuracy of the statistical model.

Systems and methods are herein provided to meet the above outlined objects of the invention.

Methods include enhancing compatibility of a first document of an entity with an organization's database on a computer server. A computer hardware processor running a statistical model based on the database may populate data fields in a second document. Methods may include using a computer hardware processor to digitize a first document from a first format into a digital format, where the first format may not be compatible with the database. In one aspect, the digital format of the document is in bytes. Methods may further include using a computer hardware processor to convert the first document from a digital format into a second format, where the second format of the first document may be compatible with the organization's database. Methods may include using a computer hardware processor to populate the database on the computer server with data from the document in the second format. Methods may further include updating the statistical model based on data from the first document. Methods may further include receiving a request indicating that an entity seeks to complete the second document. Methods may include using the statistical model, based on the data stored in the database, to pre-populate at least one data field in the second document. Methods may further include transmitting, to the entity, the second document with at least one data field pre-populated. Methods may include receiving, from the entity, the second document in completed form.

Methods may further include storing the second document in the completed form on the computer server. Methods may include updating the database with data from the second document in completed form. Methods may further include updating the statistical model based on data from the second document.

Methods may further include determining if there is a change between at least one data field in the pre-populated second document transmitted to the entity and a similar data field in the completed second document received from the entity. Methods may include providing the entity with the chance to assess if the change is correct. With receipt of confirmation from the entity that the change is correct, methods may further include storing the second document in completed form on the computer server. Methods may include updating the database with data from the second document in completed form. Methods may further include saving the second document on the computer server. Methods may include updating the statistical model based on data from the second document and the confirmation received from the entity that the change is correct.

When the entity provides feedback indicating that the change is incorrect, methods may further include storing a correct version of the second document on the computer server, the correct version of the second document reflecting the feedback received from the entity. Methods may include updating the database with data from the correct version of the second document. Methods may further include saving a correct version of the second document on the computer server. Methods may include updating the statistical model based on data from the second document and the feedback received from the entity that the change is incorrect.

When the entity provides feedback indicating that the change is incorrect, methods may further include determining if a count of incorrect changes exceeds a threshold. When the count of incorrect changes exceeds the threshold, the entity may receive a third document without the pre-populating any fields. Methods may include receiving the third document back from the entity in completed form. Methods may further include updating the database with data from the third document. Methods may include saving the third document on the computer server. Methods may further include updating the statistical model. Receiving the third document in completed form may assist in updating the statistical model to improve the statistical model's accuracy in pre-populating fields in a document.

When the count of incorrect changes does not exceed the threshold, methods may further include pre-populating at least one data field and transmitting the third document to the entity. Methods may include receiving the third document back from the entity in completed form. Methods may further include updating the database with data from the third document. Methods may include saving the third document on the computer server. Methods may further include updating the statistical model based on data from the third document.

Returning to the method for enhancing compatibility of a first document of an entity with an organization's database on a computer server, where the database may be used to guide a statistical model in populating data fields in a second document, methods may further include, when receiving a request indicating that an entity seeks to complete the second document, determining if a confidence value exceeds a confidence threshold. When the confidence value exceeds the confidence threshold, methods may include using the statistical model, based on the data stored in the database, to pre-populate at least one data field in the second document. Methods may further include the steps previously described.

When the confidence value does not exceed the confidence threshold, methods may further include transmitting the second document to the entity without pre-populating any fields. Methods may include receiving the second document back from the entity in completed form. Methods may further include updating the database with data from the second document. Methods may include saving the second document on the computer server. Methods may further include updating the statistical model. Receiving the second document in completed form may assist in updating the statistical model to improve the statistical model's accuracy in pre-populating fields in a document.

When digitizing a document, for example a first document or a second document, methods may further include accomplishing the digitization by use of one or more computer hardware processors to perform optical character recognition.

When referring to data in this summary, the reference may be to data from a document. The reference may be to metadata from a document. The reference may be to data and metadata from a document.

A system may include at least one computer hardware processor and at least one non-transitory computer-readable storage medium storing processor-executable instructions. This system, when executed by the at least one computer hardware processor, may cause the at least one computer hardware processor to perform the above-described methods.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which.

DETAILED DESCRIPTION OF THE DISCLOSURE

Figure 1:
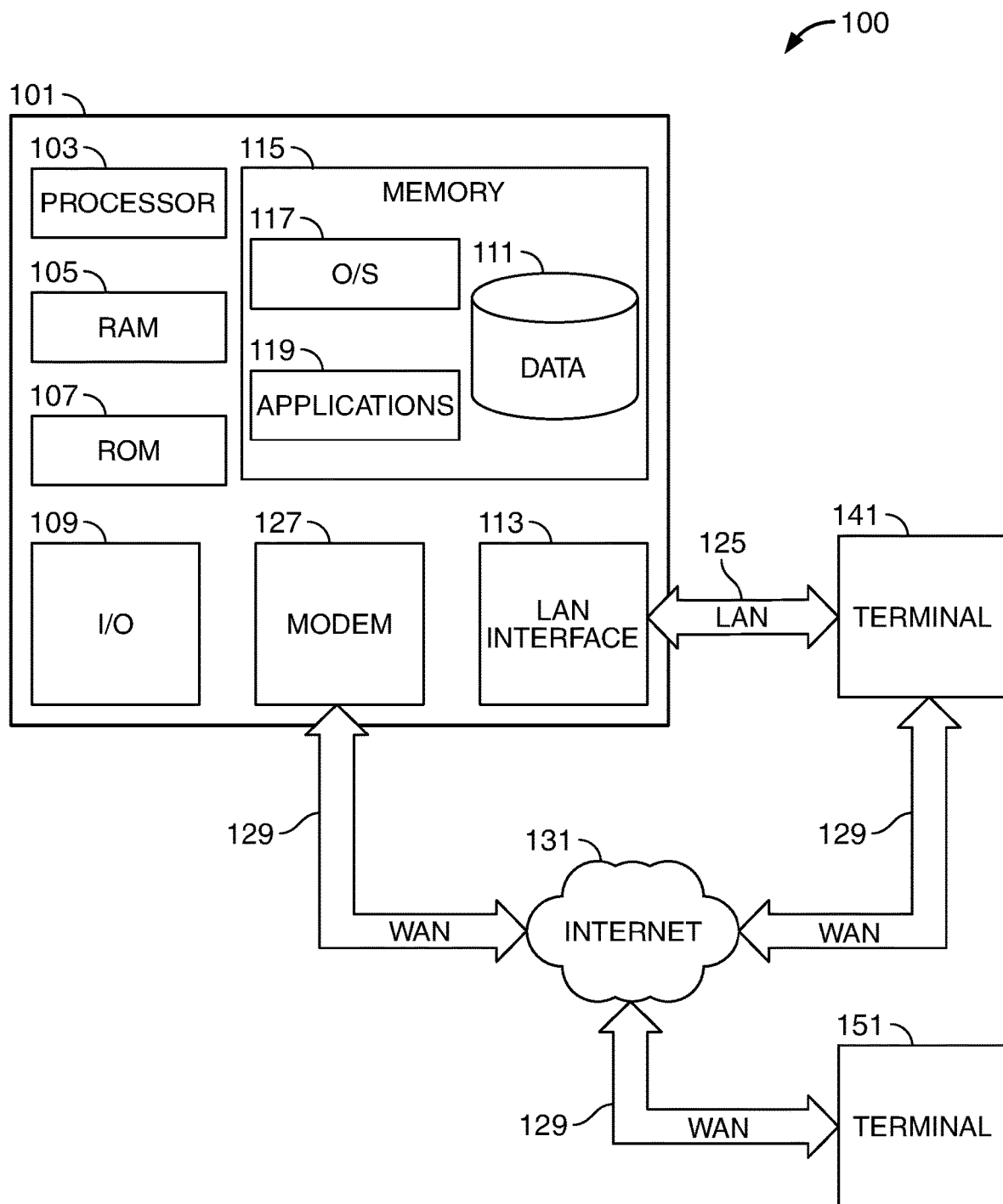
FIG. 1 is a block diagram of apparatus in accordance with principles of the disclosure.

Organizations maintain databases containing vital information to the organization's operations. Submissions from various entities may build these databases. These submissions may be in the form of documents. Documents may contain data and metadata. Entities may submit the documents to the organization by a variety of ways including ways that allow for extraction of the data and metadata from the documents to populate the databases. However, some entity submissions may not be compatible with the database.

In instances where a document submission to an organization by an entity is not compatible with the organization's database, the incompatibility may be manifest such that a computer hardware processor is not able to extract data and metadata from the document or is not able to use extracted data and metadata to populate a database. The described incompatibility may be due to the format of the submitted document. For example, the document format might be that of a scanned image or a picture. The computer hardware processor, for example, may need for the data to be in a textual form for data and metadata to be extractable for updating the database.

In one aspect of the current disclosure, described are systems and methods for digitizing a first format, such as a scan or a picture, into a digital format. A computer hardware processor may further convert the document into another format thereby facilitating extractions of the document's data and metadata.

Another aspect of the current disclosure may include, for example, a collection of documents submitted to an organization over time. The organization may have a current system that accumulates submitted documents and archives them without extracting data and metadata. The organization may desire to implement a more advanced system where a computer hardware processor extracts data and metadata from the documents and uses the data and metadata to populate a database. The submitted documents may be in a format that the computer hardware processor does not recognize or cannot extra data and metadata to populate the database. In such instances, the current disclosure describes systems and methods for digitizing a first format, such as a scan or a picture, into a digital format. The computer hardware processor may extract data and metadata from the digital format of the document or from a further reformat of the document.

A further aspect of the current disclosure includes utilizing a populated database, such as the one described herein, to train and implement a statistical model. The statistical model may, for example, utilize an artificial intelligence (AI) tool, such as a machine learning AI system or a deep learning AI system. The statistical model may be located on a computer server, for example, the computer server of an organization. The statistical model may make various predictions based on historical data and metadata, for example, from documents submitted by various entities.

For example, the computer hardware processor running a statistical model may upload data and metadata from a document received from an entity. The computer hardware processor running a statistical model may determine a document type. In an iterative way, classifying documents into distinct types may facilitate further training and utilizing the statistical model. For example, instead of just utilizing data from a specific entity or from every entity in developing a statistical model, classification allows the use of subsets of documents. The data and metadata from these documents may provide for an enhanced accuracy of the statistical model as the set of data used to train the model may be greater.

As another example, when receiving a request from an entity to complete a document, the computer hardware processor running a statistical model may pre-populate all or portions of the fields in the requested document. The computer hardware processor running a statistical model may provide a document to the requesting entity to verify pre-populated fields and to complete the fields that were not pre-populated.

The computer hardware processor may ascertain the confidence level of the statistical model. For example, the computer hardware processor may ascertain a pre-population confidence level. It may ascertain a post-population confidence level. A pre-population confidence level refers to a measure in the confidence of the statistical model before at least one field of a current document is pre-populated by using the statistical model. The computer hardware processor may ascertain a pre-population confidence level, for example, by testing statistical model predictions against existing documents stored on a computer server used to generate the model. Achieving the pre-population confidence level may occur when predictions by the statistical model match documents stored on the computer. Such an assessment may lead to utilizing the statistical model to pre-populate a document when an entity makes a request for the document from the organization. Failing the pre-population confidence level may occur when predictions by the statistical model do not match documents stored on the computer. For example, one or more document submissions by one or more entities may be subsequently received and used to update the database and statistical model. The additional data and metadata from the one or more documents may facilitate further training the model to bring it into compliance with a confidence level requirement. In another aspect, adjusting the statistical model may improve it and thereby achieve the pre-population confidence level.

A post-population confidence level refers to a measure in the confidence of the statistical model after the computer hardware processor utilizing the statistical model pre-populates at least one field of a current document. The computer hardware processor measures the accuracy of the pre-population of a document to a document completed by an entity. A confidence level represents less differences between the pre-population and completed document by the entity. Less differences lead to a higher confidence level. In reaction to differences, the computer hardware processor reaches out to the entity to confirm that the change was intentional.

When the statistical model makes the error, the computer hardware processor may keep count of the unsuccessful pre-populated field entry attempts. When the count exceeds a threshold, a post-population confidence level may fall out of compliance indicating a low confidence level in the statistical model. Dealt with further in the description are instances where an entity made the error.

If the post-population confidence level falls out of compliance, the computer hardware processor implements one or more options. For example, the computer hardware processor may add data and metadata from the received completed document to further train the model. The computer hardware processor may use additional completed documents to extract data and metadata for the purposes of updating the statistical model. The additional data and metadata from the one or more documents may facilitate further training the model to bring it into compliance with a confidence level requirement. In another aspect, the computer hardware processor or a programmer may adjust the statistical model may improve to make it achieve the pre-population confidence level.

An additional aspect of this disclosure includes error detection for submissions from an entity. When an entity requests a document, a computer hardware processor may utilize a statistical model to provide one or more pre-populated fields in the document provided to the entity. The entity may then check for the accuracy of the pre-populated fields and may add information to any of the other fields which were not pre-populated. The computer hardware processor may compare the document sent to the entity to the document received. When there is a discrepancy in the pre-populated fields, as described previously, the computer hardware processor may communicate the changed field or fields to the entity to confirm that the change was intentional. This action may give the entity an extrinsic way to check its work for potential errors.

When referring to data in this description, the reference may be to data from a document. The reference may be to metadata from a document. The reference may be to data and metadata from a document.

When referring to data and metadata in this description, the reference may be to both data and metadata from a document. The reference may be to either metadata or data from a document.

A further aspect of this disclosure includes using a statistical model to assist an organization in fraud detection. For example, when a submission of a document from an entity is received by an organization and the document is not compatible with the organization's database, the incompatibility may be manifest such that a computer hardware processor is not able to extract data and metadata from the document or is not able to use extracted data and metadata to populate a database. The computer hardware processor may digitize the document into a digital format. The computer hardware processor may add data and metadata from the digitized document to a database on a computer server. In another aspect, the computer hardware processor may convert the document from a digital format to another format, and then add the data and metadata to the database on the computer server.

Another aspect of this disclosure includes using a computer hardware processor to build a statistical model from one or more documents stored at a computer server. The statistical model references data, metadata, or data and metadata extracted from the documents and stored on a database at the computer server. In one aspect, the format of the documents is not compatible with the format of the database. The computer hardware processor may digitize the document into a digital format. The computer hardware processor may add data and metadata from the digitized document to a database on a computer server. In another aspect, the computer hardware processor may convert the document from a digital format to another format, and then add the data and metadata to the database on the computer server.

By referencing the populated database, when an entity submits a document, a statistical model on a computer server may compare the submitted document with similar prior submissions. The computer hardware processor may build the statistical model utilizing the data and metadata in a database found on a computer server. The computer hardware processor may identify specific entity identifier information that facilitates locations of relevant data and metadata of potential relevance to the entity. The computer hardware processor may use the entity identifier information to use a statistical model to determine expected inputs by the entity in the submitted document. When there is a difference between data and metadata in the submitted document from an entity and what the statistical model predicted the entity would enter, the computer hardware processor may submit the document for further analysis. For example, the computer hardware processor implements human review of the document. The computer hardware processor may implement a specialized algorithm for assessing potential threats of fraud. Furthermore, the computer hardware processor may enter the results of the human review or the specialized algorithm review into the database as data to assist in training and updating the statistical model to manage future document submissions by this entity and other entities.

Another aspect of fraud detection may be looking for anomalous patterns in an entity's behavior. The computer hardware processor may utilize a statistical model to identify unusual behavior by an entity. Examples of anomalous behavior may include overly frequent submissions, submissions of a similar nature in a shorter than expected timeframe, changes in personal information such as identification numbers, name, phone numbers and email addresses. When crossing a threshold of concern, the computer hardware processor flags the matter for further review, such as review by a human.

A further aspect of fraud detection may include designating an entity as a trusted entity upon presentation of proper credentials. When designating an entity as a trusted entity, the computer hardware processor may look for potential errors instead of fraudulent submissions. The computer hardware processor may provide the potential errors to the entity for confirmation.

The computer hardware processor may relax fraud detection when the submission comes from a trusted device. For example, one or more entities might give their own credentials to use the device. Therefore, the computer hardware processor may view submissions from that device as safe. Instead, the computer hardware processor will view anomalies as potential errors. The computer hardware processor may provide the entity with the potential error for confirmation.

A further aspect of the disclosure includes automating a process for submitting compliance forms to a regulatory body. There may be instances where the organization needs to submit a received document in whole or in part to a regulatory body. When documents are not compatible or are poorly compatible with a computer server, obtaining data and metadata from the document for use in the submission of compliance forms may be difficult. In one aspect, the disclosure may include a computer hardware processor for digitizing the document into a digital format. In a further aspect, the computer hardware processor may extract data and metadata from the digital format for populating a compliance form. In a further aspect, the computer hardware processor may use the digital format to populate a database. The computer hardware processor may use the database as a source of information for populating a compliance form. In a further aspect, the computer hardware processor may convert the document from a digital format into another format. The computer hardware processor may then populate the database with data and metadata from this document format. The computer hardware processor may utilize the updated database as a source of information for populating a compliance form.

The computer hardware processor may utilize a statistical model on a computer server to assist in populating and submitting a compliance form. The computer hardware processor may identify specific entity identifier information that facilitates locations of relevant data and metadata of potential relevance to the entity. The computer hardware processor may use the entity identifier information to use a statistical model to determine expected inputs by the entity in the submitted document. When there is a difference between data and metadata in the submitted document from an entity and what the statistical model predicted the entity would enter, the computer hardware processor may submit the document back to the entity for confirmation of the entity's submission. Once clarified, the computer hardware processor may prepare a compliance form for submission to a regulatory body.

The computer hardware processor may use the statistical model to determine an appropriate compliance form based on the data and metadata found in a submitted document from an entity. The statistical model based on data and metadata found in a database on a computer server may auto-populate some or all the fields on a compliance form based on one or more submitted documents.

The statistical model on computer servers described in this specification may operate as a form of artificial intelligence (AI). One type of AI is machine learning AI systems. Another type of AI is deep learning AI systems.

One may program a machine learning AI system to identify patterns in data sets and make decisions based on the patterns. One typically uses machine learning algorithms to predict future behavior based on historical patterns. By providing new and updated data, machine learning AI systems may improve their predictions. However, even though machine learning AI systems may improve their predictions, such systems only detect patterns based on how they are pre-programmed to review provided data. Machine learning systems do not adapt on their own to look at data in unusual ways or flag patterns in the data they were not pre-programmed to search for.

On the other hand, deep learning AI systems adapt when exposed to different patterns of data. Deep learning AI systems may uncover features or patterns in data that they were never specifically programmed to find or search for. Deep learning AI systems are typically based on neural networks. A neural network takes an input and passes the input through a network of neurons—called layers—and provides an output. The more layers of neurons which are part of the network, the "deeper" the network. A neural network learns from outputs flagged as erroneous and "adapts" its neuron connections such that the next time it receives a particular input it generates a relevant output.

Neural networks must undergo training by analyzing data sets. Neural networks learn from the training data sets provided to them and rearrange interconnections between the neurons in response to training data. The strength or weight of connections between the neurons or layers can vary. A connection between two or more layers can be strong, weak, or anywhere in between. When a neural network self-adapts it adjusts the strength of the connections among its neurons to generate more accurate outputs.

To get a neural network to provide accurate outputs, neuron connections are adjusted by repeatedly training the network by exposing it to training data sets. There can be thousands and millions of neurons or layers in a network and adjusting their connections between the layers is a compute-intensive matrix-based mathematical procedure.

Typically, training of deep learning AI systems is performed using Graphics Processing Unit ("GPU") clusters of servers. A GPU is hardware capable of performing math computations over a huge amount of data at the same time. GPU's do not operate as fast as central processing units ("CPUs"). However, GPUs are capable of processing larger quantities of data per unit of time. Thus, even though each individual GPU operation may execute more slowly, applying computational operations to more data in parallel exceeds CPU performance, allowing AI system to be fully trained faster.

The training phase may go on for multiple iterations until the outputs of the AI system are satisfactory and accurate. Once that happens, the trained neural network is released to production on less powerful hardware. Data processed after the AI system is in production may be fed back into the neural network to correct it or enhance output according to the latest trends detected in newly acquired data sets. Therefore, the process of training and retraining a neural network can occur iteratively over time. Retraining a neural network is important for maintaining its accuracy with respect to new data sets.

In one aspect, a computer hardware processor may implement a statistical model in various systems and methods throughout this specification, and that statistical model may be a machine learning AI system.

In another aspect, a computer hardware processor may implement a statistical model in various systems and methods throughout this specification, and that statistical model may be a deep learning AI system. In one aspect, the deep learning AI system may be a neural network. In a further aspect, the neural network may be a deep neural network.

In further aspect, the computer hardware processor may implement more than one statistical model in various systems and methods taught throughout this specification, and the more than one statistical model may be machine learning AI systems. In another aspect, the more than one statistical model may be deep learning AI systems. These deep learning AI systems may be neural networks. In another aspect, the more than one statistical model may be a combination of machine learning AI systems and deep learning AI systems.

Systems and methods are herein provided to meet the above outlined objects of the invention.

Methods for enhancing compatibility of a document of an entity with an organization's database on a computer server. Methods may include a computer hardware processor digitizing a document from a first format into a digital format, such as bytes, where the first format may not be compatible with the database. Methods may further include using a computer hardware processor to convert the document from a digital format into a second format, where the second format of the document may be compatible with the organization's database. Methods may include using a computer hardware processor to populate the database on the computer server with data from the document in the second format. Methods may further include storing the populated database and the document in the second format on the computer server.

Methods may further include receiving the document in the first format from the entity.

Methods may further include storing the document in a first format on the computer server.

Methods may further include use of at least one computer hardware processor to perform optical character recognition. Performance of optical character recognition may assist in digitizing the document in a first format to a digital format.

Methods may further include using the at least one computer hardware processor to populate a database from the document in a second format with data and metadata from the document.

In a different aspect of the disclosure, systems for enhancing a compatibility of a first document with a database on a computer server that may be used to guide a statistical model in populating data fields in a second document, which may include at least one computer hardware processor, and at least one non-transitory computer-readable storage medium storing processor-executable instructions that, when executed by the at least one computer hardware processor, may cause the at least one computer hardware processor to perform the following steps. Systems may cause the computer hardware processor to digitize a first document from a first format into a digital format, such as bytes, where the first format may not be compatible with the database. Systems may further cause the computer hardware processor to convert the first document from a digital format into a second format, where the second format of the first document may be compatible with the organization's database. Systems may cause the computer hardware processor to populate the database on the computer server with data from the document in the second format. Systems may further cause the computer hardware processor to update the statistical model based on data from the first document. When receiving a request indicating that an entity seeks to complete the second document, systems may cause the computer hardware processor to use the statistical model, based on the data stored in the database, to pre-populate at least one data field in the second document. Systems may further cause the computer hardware processor to transmit, to the entity, the second document with at least one data field pre-populated. System may receive, from the entity, the second document in completed form.

Systems may cause the computer hardware processor to store the second document in completed form on the computer server. Systems may further cause the computer hardware processor to update the database with data from the second document in completed form. Systems may cause the computer hardware processor to update the statistical model based on data from the second document.

Systems may cause the computer hardware processor to determine if there is a change between the at least one data field in the pre-populated second document transmitted to the entity and a similar data field in the completed second document received from the entity. Systems may further cause the computer hardware processor to provide the entity with the chance to assess if the change is correct. When the entity confirms that the change is correct, systems may cause the computer hardware processor to store the second document in completed form on the computer server. Systems may further cause the computer hardware processor to update the database with data from the second document in completed form. Systems may cause the computer hardware processor to save the second document on the computer server. The act of saving a document to the computer server may include writing data to a hard drive. Systems may further cause the computer hardware processor to update the statistical model based on data from the second document and the confirmation received from the entity that the change is correct.

When receiving feedback from the entity indicating that the change is incorrect, systems may cause the computer hardware processor to store a correct version of the second document on the computer server, the correct version of the second document reflecting the feedback received from the entity. Systems may cause the computer hardware processor to update the database with data from the correct version of the second document. Systems may further cause the computer hardware processor to save a correct version of the second document on the computer server. Systems may cause the computer hardware processor to update the statistical model based on data from the second document and the feedback received from the entity that the change is incorrect.

When receiving feedback from the entity indicating that the change is incorrect, systems may cause the computer hardware processor to determine if a count of incorrect changes exceeds a threshold. When the count of incorrect changes exceeds the threshold, when receiving a request from an entity for a third document, systems may cause the computer hardware processor to transmit the third document to the entity without pre-populating any fields. Systems may further cause the computer hardware processor to receive the third document back from the entity in completed form. Systems may cause the computer hardware processor to update the database with data from the third document. Systems may further cause the computer hardware processor to save the third document on the computer server. Systems may cause the computer hardware processor to update the statistical model based on data from the third document. Receiving the third document in completed form may assist in updating the statistical model to improve the statistical model's accuracy in pre-populating fields in a document.

When the count of incorrect changes does not exceed the threshold, when receiving a request from an entity for a third document, systems may cause the computer hardware processor to pre-populate at least one data field and transmitting the third document to the entity. Systems may further cause the computer hardware processor to receive the third document back from the entity in completed form. Systems may cause the computer hardware processor to update the database with data from the third document. Systems may further cause the computer hardware processor to save the third document on the computer server. Systems may cause the computer hardware processor to update the statistical model based on data from the third document.

Returning to systems for enhancing compatibility of a first document of an entity with an organization's database on a computer server, where the database may be used to guide a statistical model in populating data fields in a second document, systems may cause the computer hardware processor to, when receiving a request indicating that an entity seeks to complete the second document, determine if a confidence value exceeds a confidence threshold. When the confidence value exceeds the confidence threshold, systems may further cause the computer hardware processor to use the statistical model, based on the data stored in the database, to pre-populate at least one data field in the second document. Systems may further cause the computer hardware processor to transmit, to the entity, the second document with at least one data field pre-populated. System may receive, from the entity, the second document in completed form.

When the confidence value does not exceed the confidence threshold, systems may cause the computer hardware processor to transmit the second document to the entity without pre-populating any fields. Systems may cause the computer hardware processor to receive the second document back from the entity in completed form. Systems may further cause the computer hardware processor to update the database with data from the second document. Systems may cause the computer hardware processor to save the second document on the computer server. Systems may further cause the computer hardware processor to update the statistical model based on data from the second document. Receiving the second document in completed form may assist in updating the statistical model to improve the statistical model's accuracy in pre-populating fields in a document.

When digitizing a document, for example a first document or a second document, systems may cause the computer hardware processor to accomplish the digitization by use of one or more computer hardware processors to perform optical character recognition.

When referring to data in the current methods, systems may cause the computer hardware processor to populate the database with metadata from the first document or the second document, respectively.

Described are illustrative embodiments of apparatus and methods in accordance with the principles of the invention with reference to the accompanying illustrative drawings, which form a part hereof. Utilizing other embodiments, and structural, functional, and procedural modifications may stay within the scope and spirit of the present invention.

The drawings show illustrative features of apparatus and methods in accordance with the principles of the invention. The drawings show illustrative features in the context of selected embodiments. One may practice, in accordance with the principles of the invention, one of the embodiments along with features shown in connection with another of the embodiments.

Apparatus and methods described herein are illustrative. Apparatus and methods of the invention may involve some or all the features of the illustrative apparatus and/or some or all the steps of the illustrative methods. One may perform the steps of the methods in an order other than the order shown or described herein. Some embodiments may omit steps shown or described in connection with the illustrative methods. Some embodiments may include steps that are not shown or described in connection with the illustrative methods but shown or described in a different portion of the specification.

One of ordinary skill in the art will appreciate that one may perform the steps shown and described herein in other than the recited order and that one or more steps illustrated may be optional. The methods of the above-referenced embodiments may involve the use of any suitable elements, steps, computer-executable instructions, or computer-readable data structures. In this regard, disclosed are other embodiments as well that can be partially or wholly implemented on a computer-readable medium, for example, by storing computer-executable instructions or modules or by utilizing computer-readable data structures.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein. (Each of the apparatus illustrated in FIGS. 3-5 and 9-11 and/or described herewith, including Hash Table 302, Edge Computing Device 304, hashing algorithm processor 404 and centralized data repository 930, may include some or all the elements and apparatus of system 100.)

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or API. One may understand that web-based, for the purposes of this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program(s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for the purposes of this application, as engines with respect to the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
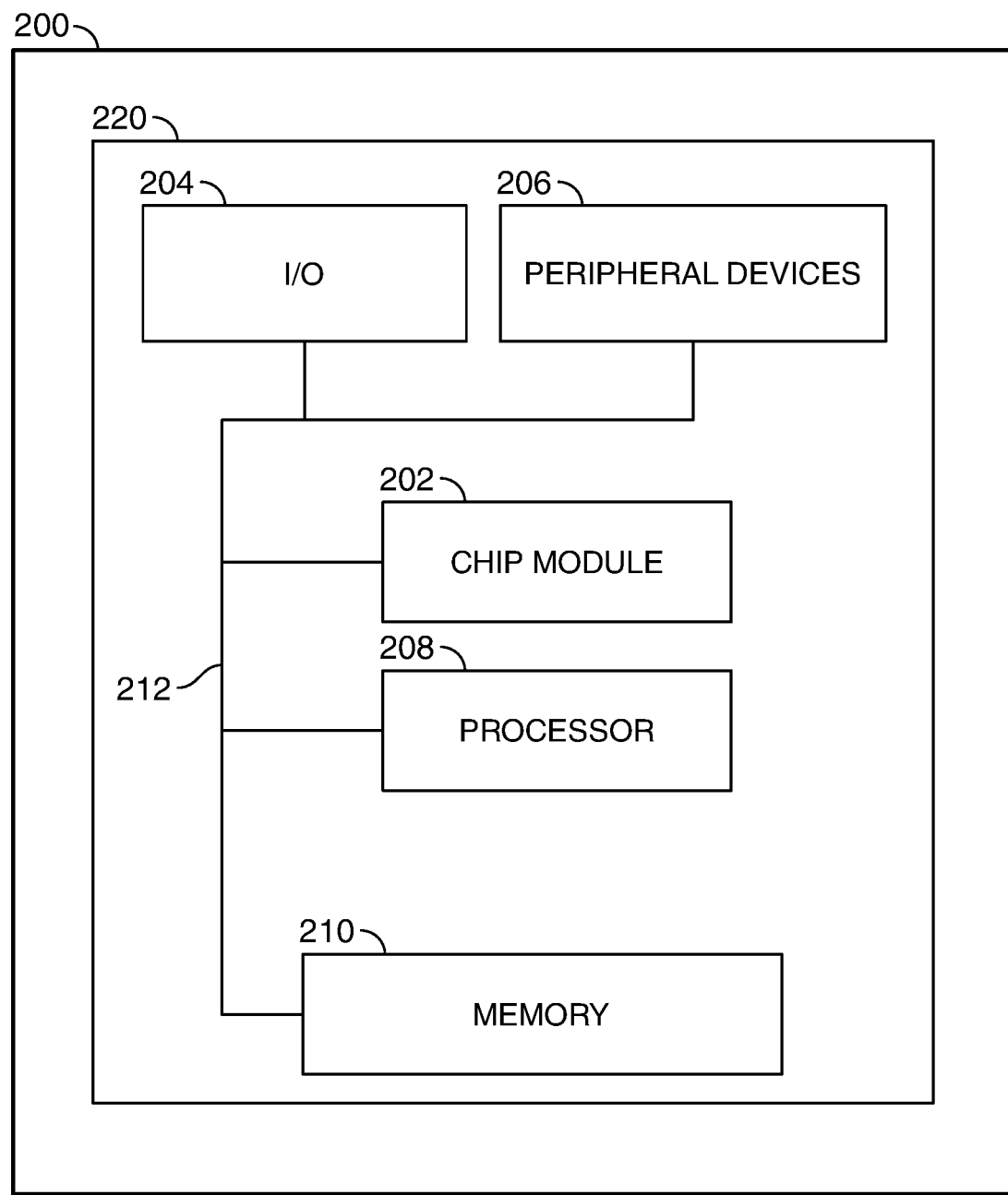
FIG. 2 is another block diagram of apparatus in accordance with principles of the disclosure.

FIG. 2 shows an illustrative block diagram of apparatus 200. One may configure apparatus 200 in accordance with the principles of the disclosure. Apparatus 200 may be a computing device. (Apparatus 200 may include one or more features of the apparatus shown in FIGS. 3-5 and 9-11 and/or described herewith, including Hash Table 302, Edge Computing Device 304, hashing algorithm processor 404 and centralized data repository 930, and may include some or all the elements and apparatus of system 100 shown in FIG. 1.) Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
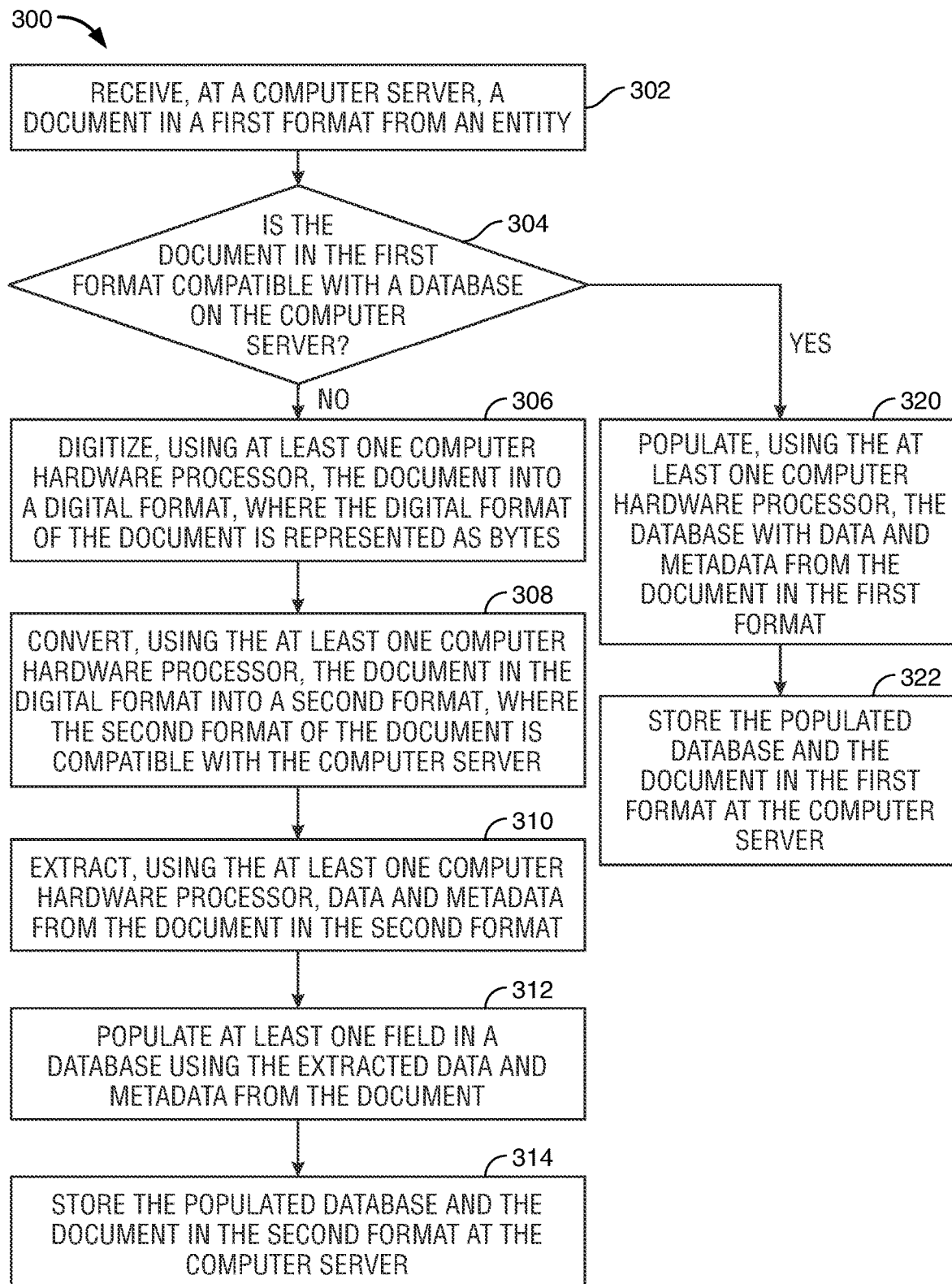
FIG. 3 is a flowchart of a process in accordance with principles of the disclosure.

FIG. 3 shows illustrative flowchart 300 of method steps for enhancing compatibility of a document of an entity with a database of an organization on a computer server.

Depicted is flowchart 300 as starting at step 302. Received at step 302 is a document in a first format from the entity, at the computer server. At step 304, it may be determined if the document in the first format is compatible with the database on the computer server.

If the document in the first format is compatible with the database, then at step 320, at least one computer hardware processor populates the database with data from the document in the first format. The at least one computer hardware processor may populate the database with metadata from the document in the first format. The at least one computer hardware processor may populate the database with data and metadata from the document in the first format. At step 322, the at least one computer hardware processor stores the populated database, and the document in the first format at the computer server.

If the document in the first format is not compatible with the database, then at step 306, at least one computer hardware processor digitizes the document into a digital format such as bytes.

At step 308, at least one computer hardware processor converts the document from the digital format into a second format, where the second format of the document may be compatible with the computer server.

At step 310, at least one computer hardware processor may extract data, metadata, or both data and metadata from the document in the second format.

At step 312, at least one computer hardware processor may populate at least one field in a database using the extracted data, metadata, or data and metadata from the document.

At step 314, the computer servers store the populated database, and the document in the second format.

Figure 4:
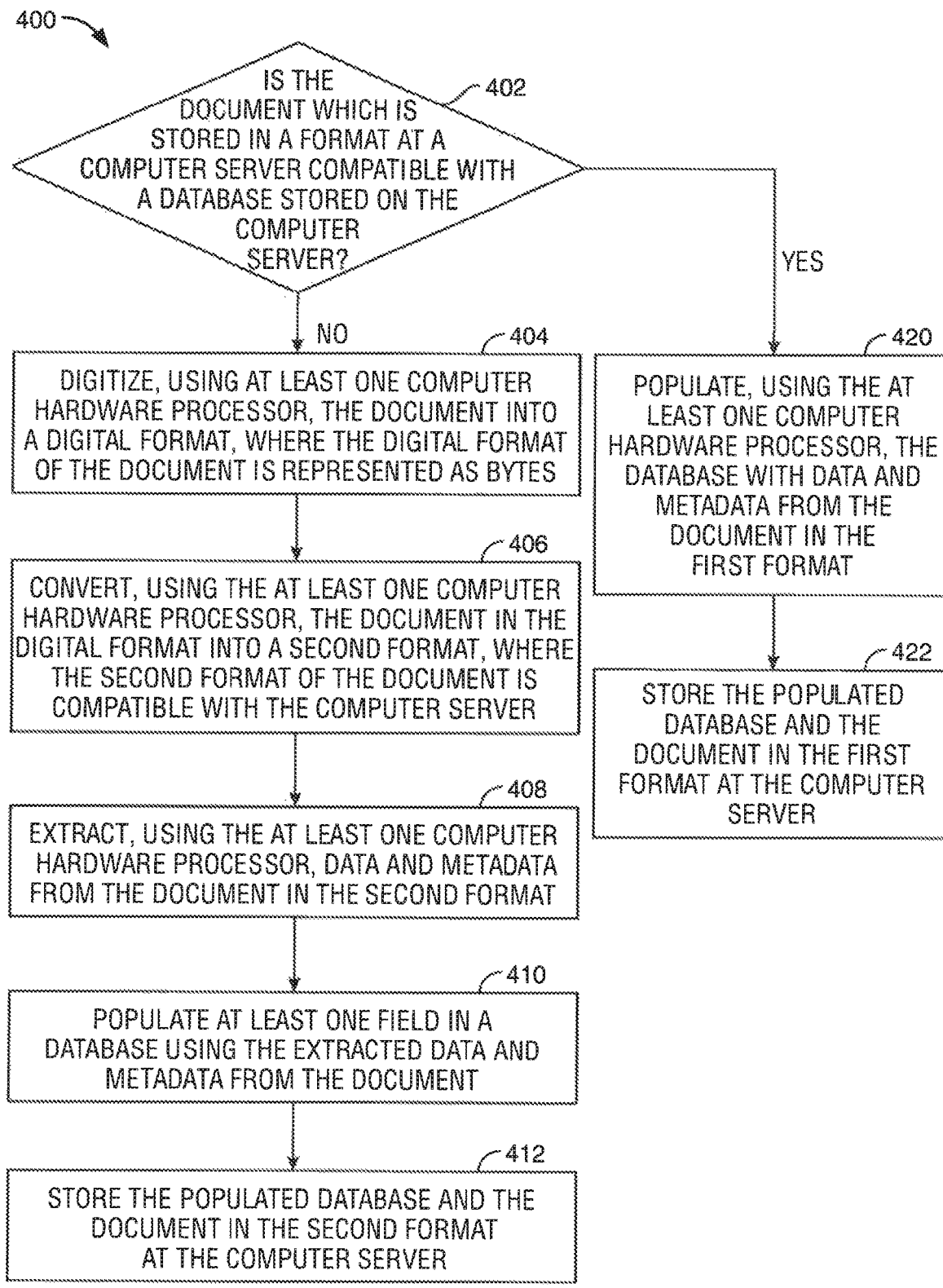
FIG. 4 is another flowchart of a process in accordance with principles of the disclosure.

FIG. 4 shows illustrative flowchart 400 of method steps for harvesting data from one or more documents stored on a computer server for populating a database of an organization. The computer servers may store the database. The one or more documents may be a legacy system. The one or more documents may not be compatible with the database. The method may enhance the compatibility of one or more documents.

Depicted is flowchart 400, starting at step 402. At step 402, at least one computer hardware processor determines the compatibility of a document stored in a first format with a database stored on a computer server.

If the document in the first format is compatible with the database, then at step 420, at least one computer hardware processor populates the database with data, metadata, or both data and metadata from the document in the first format. At step 422, the computer servers store the populated database, and the document in the first format.

If the document in the first format is not compatible with the database, then at step 404, at least one computer hardware processor digitizes the document into a digital format, such as bytes.

At step 406, at least one computer hardware processor may convert the document from the digital format into a second format, where the second format of the document may be compatible with the computer server.

At step 408, at least one computer hardware processor extracts data, metadata, or data and metadata from the document in the second format.

At step 410, at least one computer hardware processor may extract data, metadata, or data and metadata from the document and populate at least one field in a database.

At step 412, at least one computer hardware processor may populate the database and the document in the second format at the computer server.

Figure 5A:
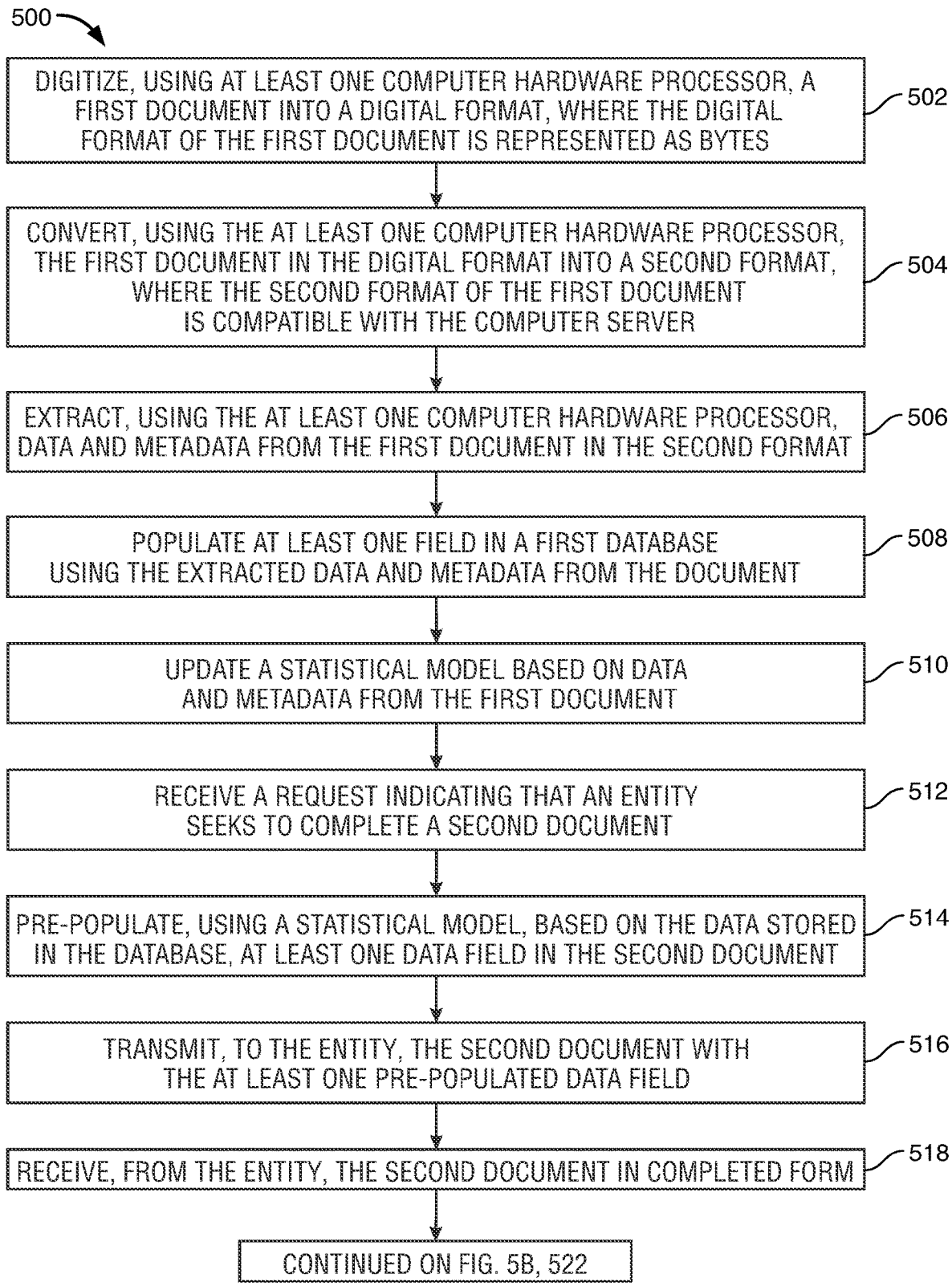
FIG. 5A is a flowchart of a process in accordance with principles of the disclosure.

FIG. 5A shows illustrative flowchart 500 of method steps for harvesting data and metadata from one or more documents stored on a computer server for populating a database of an organization. At least one computer hardware processor may update a statistical model with data, metadata, or data and metadata from the populated database. The method may include pre-populating a document requested by using the statistic model. The method may include verifying with an entity if a change is correct between the pre-populated document and a completed document received back from the entity.

Depicted is a flowchart 500, starting at step 502. At step 502, at least one computer hardware processor may digitize a document into a digital format, such as bytes.

At step 504, the at least one computer hardware processor may convert the document from the digital format into a second format, using the at least one computer hardware processor, where the second format of the document may be compatible with the computer server.

At step 506, at least one computer hardware processor may extract data, metadata, or data and metadata from the document in the second format.

At step 508, the at least one computer hardware processor may populate at least one field in a database with data, metadata, or data and metadata extracted from the document.

At step 510, at least one computer hardware processor may update a statistical model based on data, metadata, or data and metadata from the first document.

Received at step 512 is a request from an entity to complete a second document.

At step 514, the at least one computer hardware processor, using the statistical model based on the data, metadata, or data and metadata stored in the database, pre-populates at least one data field in the second document.

Transmitted, at step 516, is the second document, with at least one pre-populated data field, to the entity.

Received, at step 518, is the second document from the entity in completed form. The method continues in FIG. 5B with step 522.

Figure 5B:
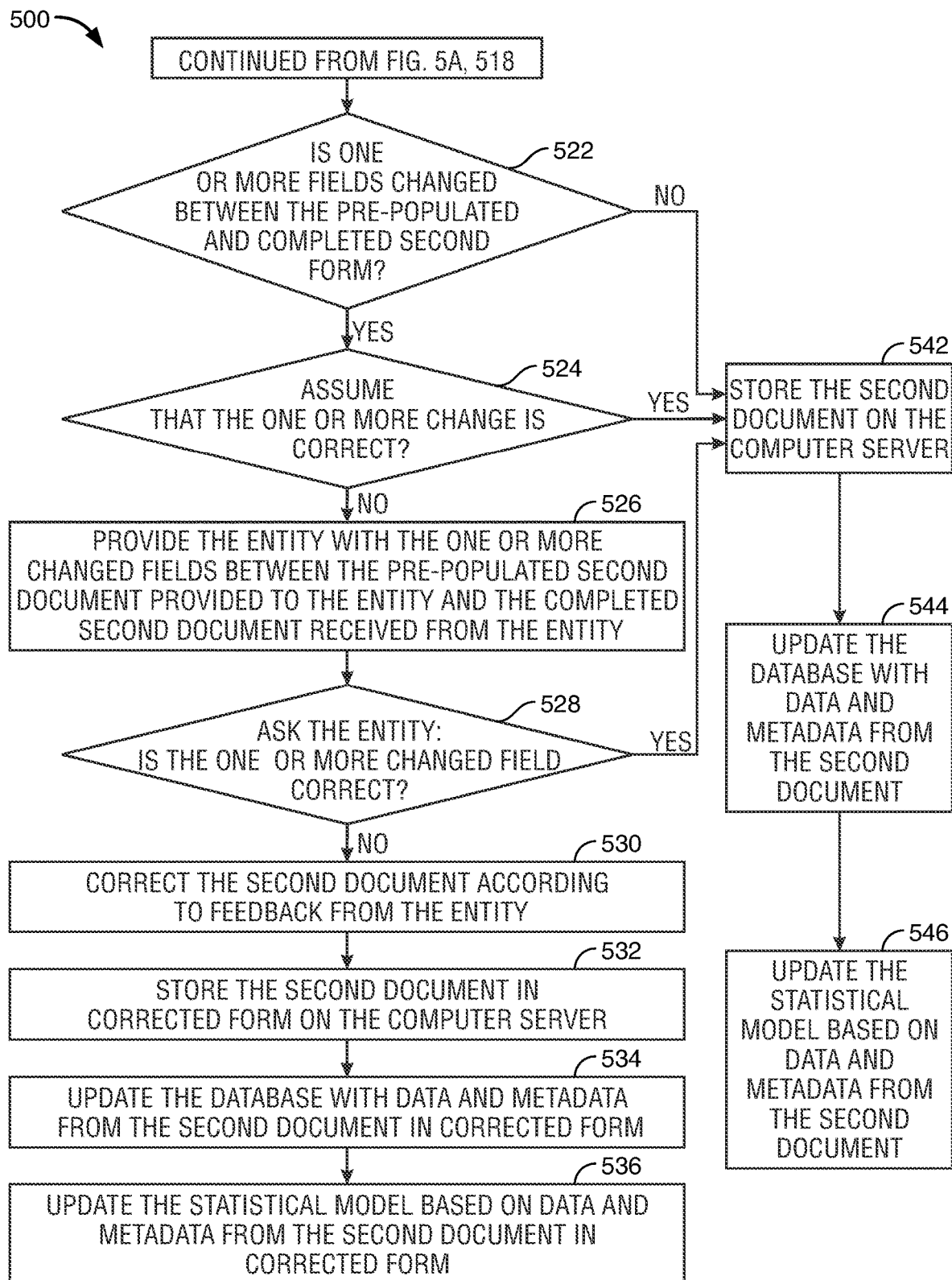
FIG. 5B is a flowchart of a process in accordance with principles of the disclosure and is a continuation of the flowchart of FIG. 5A.

FIG. 5B is a continuation of the flowchart begun in FIG. 5A. FIG. 5B shows illustrative flowchart 500 of method steps.

At step 522, it may be determined if one or more fields changed between the pre-populated and completed second form.

At step 542, with no field changed between the pre-populated and completed second form, the computer servers may: store the second document; update the database, at step 544, with data, metadata, or data and metadate from the second document; update the statistical model, at step 546, based on data, metadata, or data and metadata from the second document; and/or determine the correctness of at least one field change between the pre-populated and completed second form at step 524.

When assuming that one or more changes are correct, the servers may implement steps 542, 544 and 546, as previously described.

When assuming that one or more changes are correct, the servers may seek verification from the entity; provide the entity, at step 526, with the one or more changed fields identified between the pre-populated second document provided to the entity and the completed second document received from the entity; provide the entity, at step 528, with an inquiry as to whether the one or more changed fields in the completed second document is correct, or if the pre-populated field in the second document provided to the entity is correct and/or follow steps 542, 544 and 546 if the entity provides feedback that the one or more changed fields are correct.

At step 530, the servers may correct the second document in accordance with the feedback from the entity, at step 532, store the corrected form of the second document on the computer server, at step 534, update the database with data, metadata, or data and metadata from the second document in corrected form and/or, at step 536, update the statistical model based on data, metadata, or data and metadata from the second document in corrected form.

Figure 6A:
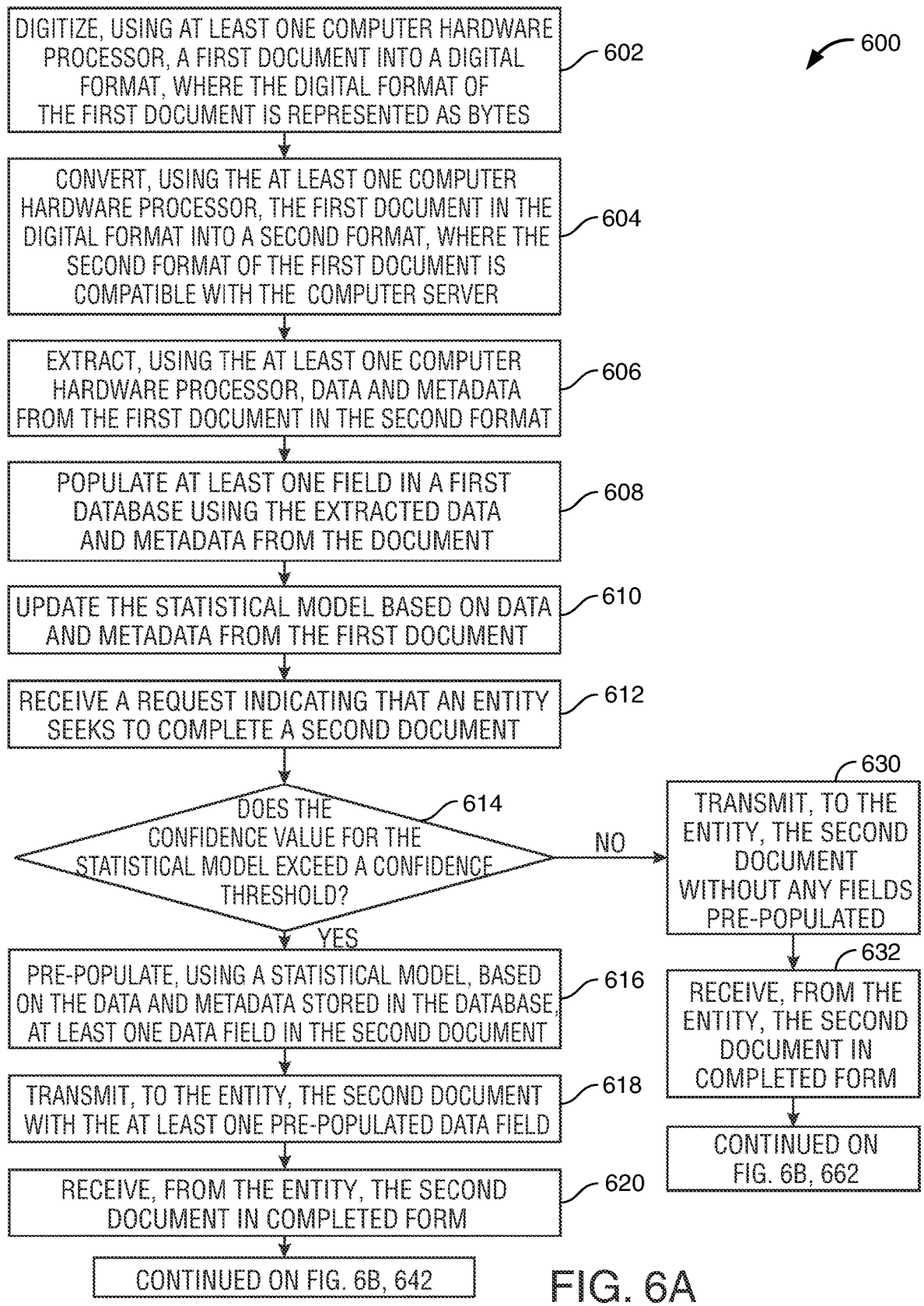
FIG. 6A is a flowchart of a process in accordance with principles of the disclosure.

FIG. 6A shows illustrative flowchart 600 for harvesting data and metadata from one or more documents stored on a computer server for populating a database of an organization. At least one computer hardware processor may update the database and a statistical model based on data and metadata from similar documents. The method may include pre-populating a document requested by using the statistic model. The method may include verifying with an entity if a change is correct between the pre-populated document and a completed document received back from the entity.

The method may further include at least one computer hardware processor to verify sufficient training of the statistical model. One may then use at least one computer hardware processor to implement the statistical model. For example, the at least one computer hardware processor may set and monitory a confidence threshold, based on a range of factors, and implement the statistic model after reaching the threshold, or may implement more training of the model before reaching the threshold.

Further, methods include at least one computer hardware processor determining a count of unsuccessful attempts to pre-populate a document. When exceeding a threshold, the method may provide for gathering more data and metadata from one or more documents completed by one or more entities. At least one computer hardware processor uses the additional data and metadata to train and update the statistical model. Once accomplishing an amount of training of the statistical model, the method may allow for utilizing the statistical method for subsequent requests to complete a document by an entity. Upon reaching a confidence threshold, such as the method described previously, or other measure of confidence, at least one computer hardware processor implements the statistical model.

Depicted is a flowchart 600, starting at step 602. At step 602, at least one computer hardware processor may digitize a document into a digital format, such as bytes.

At step 604, the at least one computer hardware processor may convert the document from the digital format into a second format, using the at least one computer hardware processor, where the second format of the document may be compatible with the computer server.

At step 606, at least one computer hardware processor may extract data, metadata, or data and metadata from the document in the second format.

At step 608, at least one computer hardware processor may populate at least one field in a database with data, metadata, or data and metadata extracted from the document.

At step 610, at least one computer hardware processor may update a statistical model based on data, metadata, or data and metadata from the first document.

Received at step 612 is a request from an entity to complete a second document.

Once accomplishing an amount of training of the statistical model, the method may allow for utilizing the statistical method for subsequent requests to complete a document by an entity.

At step 614, upon reaching a confidence threshold, such as the method described previously, or other measure of confidence, at least one computer hardware processor implements the statistical model.

At step 614, at least one computer hardware processor determines the confidence value for the statistical model. When the confidence value does not exceed a confidence threshold, then, at step 630, at least one computer hardware processor transmits the second document to the entity without any fields pre-populated.

At least one computer hardware processor receives, at step 632, the completed second document. The method continues in FIG. 6B with step 662.

When the confident value exceeds a confidence threshold, then, at step 616, the at least one computer hardware processor, using the statistical model based on the data, metadata, or data and metadata stored in the database, pre-populates at least one data field in the second document.

Transmitted, at step 618, is the second document, with at least one pre-populated data field, to the entity.

Received, at step 620, is the second document from the entity in completed form. The method continues in FIG. 6B with step 642.

Figure 6B:
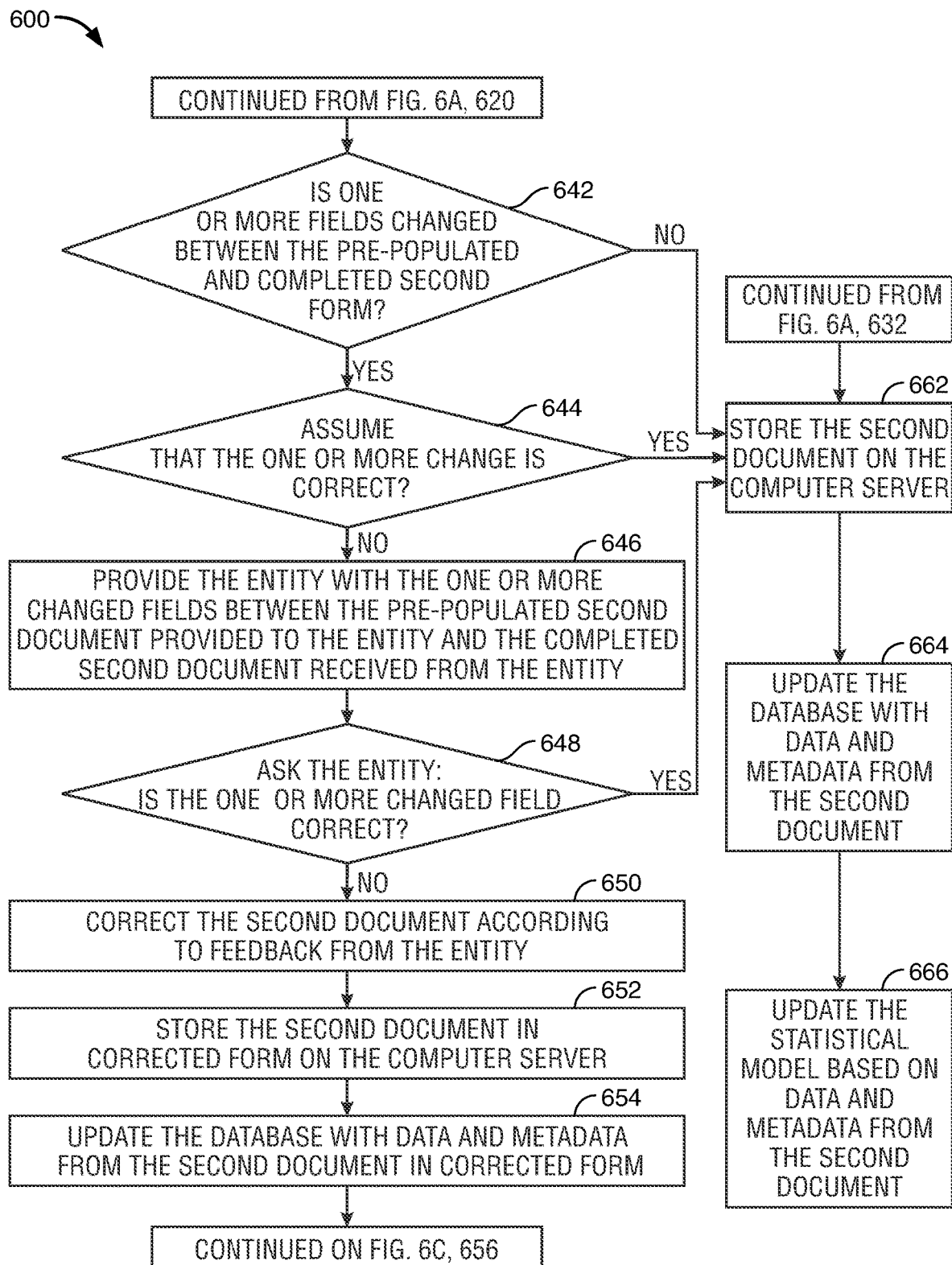
FIG. 6B is a flowchart of a process in accordance with principles of the disclosure and is a continuation of the flowchart of FIG. 6A.

FIG. 6B is a continuation of the method begun in FIG. 6A. FIG. 6B shows illustrative flowchart 600 of method steps.

Continuing from step 632 in FIG. 6A, the method continues in FIG. 6B with step 662. At step 662, at least one computer hardware processor stores the second document on the computer server.

At step 664, at least one computer hardware processor updates the database with data, metadata, or data and metadata from the second document.

At step 666, at least one computer hardware processor updates the statistical model based on data, metadata, or data and metadata from the second document.

Continuing from step 620 in FIG. 6A, the method continues in FIG. 6B with step 642. At step 642, at least one computer hardware processor determines differences in the data fields between the pre-populated and completed second document.

At step 662, at least one computer hardware processor stores the second document on the computer server when the fields are similar between the pre-populated and completed second form. At step 664, at least one computer hardware processor updates the database with data, metadata, or data and metadate from the second document. At step 666, at least one computer hardware processor updates the statistical model based on data, metadata, or data and metadata from the second document.

When there is at least one change, one may determine the correctness of at least one field changed between the pre-populated and completed second form at step 644.

When assuming that one or more changes are correct, implement steps 662, 664, and 666, as previously described.

When assuming that one or more changes are correct, seek verification from the entity. Provide the entity, at step 646, with the one or more changed fields identified between the pre-populated second document provided to the entity and the completed second document received from the entity.

Provide the entity, at step 648, with an inquiry as to whether the one or more changed fields in the completed second document is correct, or if the pre-populated field in the second document provided to the entity is correct.

Follow steps 662, 664 and 666 if the entity provides feedback that the one or more changed fields are correct.

At step 650, correct the second document in accordance with the feedback from the entity.

At step 652, store the corrected form of the second document on the computer server.

At step 654, update the database with data, metadata, or data and metadata from the second document in corrected form. The method may continue in FIG. 6C with step 656.

Figure 6C:
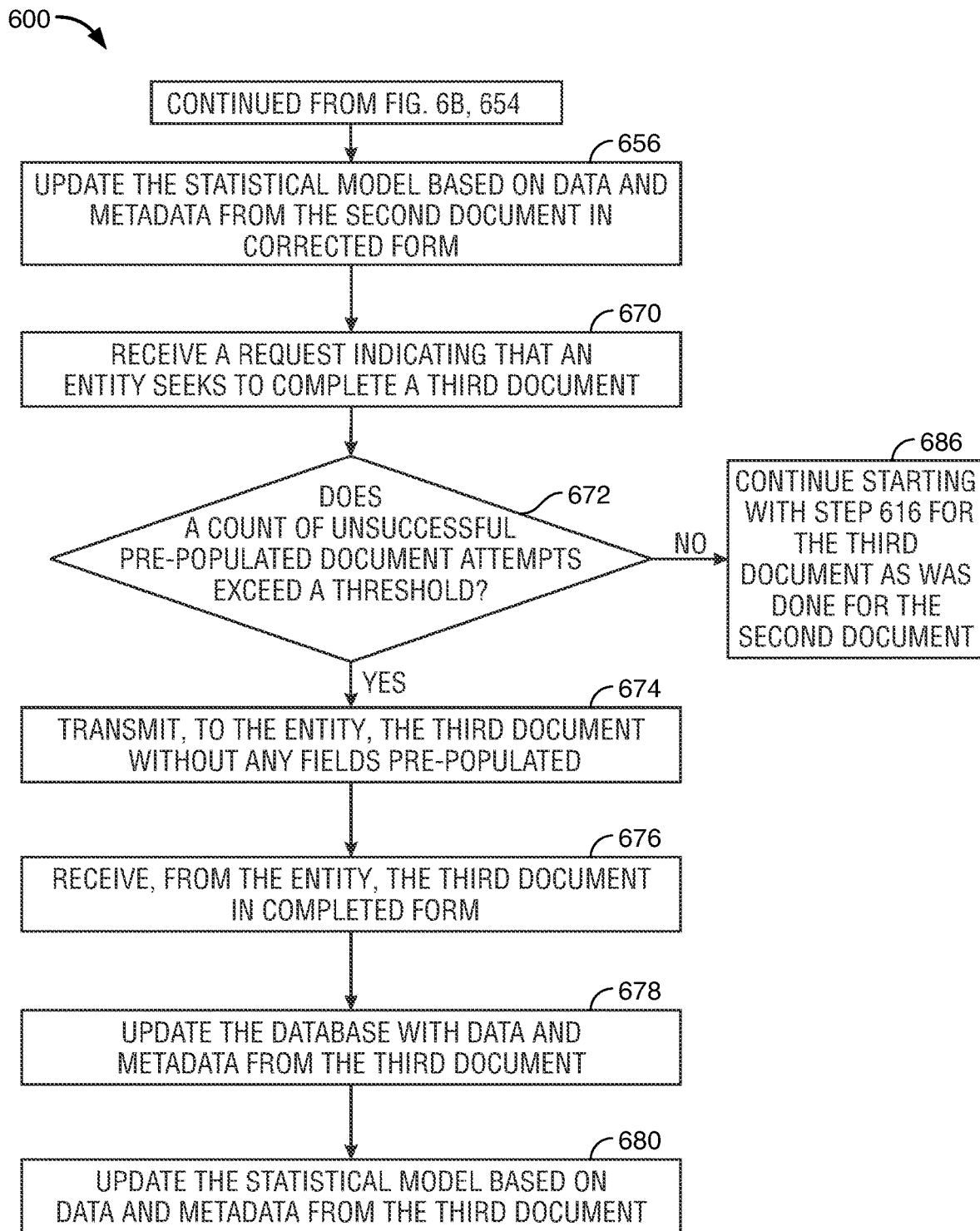
FIG. 6C is a flowchart of a process in accordance with principles of the disclosure and is a continuation of the flowchart of FIG. 6B.

FIG. 6C is a continuation of the method begun in FIG. 6B. FIG. 6C shows illustrative flowchart 600 of method steps.

At step 656, update the statistical model based on data, metadata, or data and metadata from the second document in corrected form Received, at step 670, is a request indicating that an entity seeks to complete a third document. Determined, at step 672, is a count of unsuccessful pre-populated document attempts.

If the count of unsuccessful pre-populated documents does not exceed a threshold, then, at step 686, the method may continue with step 616, except implementing the method for a third document instead of a second document.

If the count of unsuccessful pre-populated documents does exceed a threshold, then, at step 674, at least one computer hardware processor transmits the third document to the entity without any fields pre-populated.

Received from the entity, at step 676, is the third document in completed form.

At step 678, at least one computer hardware processor may update the database with data, metadata, or data and metadata from the third document.

At step 680, at least one computer hardware processor may update the statistical model based on data from the third document.

Presented herein are systems and methods for enhancing compatibility of a document to facilitate addition of data from the document to a database and use of the database to power a statistical model to further enhance a user experience. Persons skilled in the art may practice the present invention in other than the described embodiments. Presented are embodiments for purposes of illustration rather than of limitation. Only the claims that follow limit the present invention.

What is claimed is:

1. A method of enhancing compatibility of documents, extracting data to populate a database on a computer server, and training statistical models with data on the database, the method comprising:
   receiving, at a computer hardware processor, two or more first documents in a first format, the first format comprising a format that the computer hardware processor cannot use to extract data to populate the database, wherein, the two or more first documents are stored on the computer server;
   converting, using the computer hardware processor to perform optical character recognition (OCR), the two or more first documents from the first format into a second format, the second format comprising a format that the computer hardware processor can use to extract data to populate the database;
   populating, using the computer hardware processor, the database with data from the two or more first documents in the second format;
   training, using a graphics processing unit (GPU) and the database, a first statistical model, the first statistical model comprising a deep learning artificial intelligence (AI) system, to determine a reliability of a submitter of a document;
   training, using the GPU and the database, a second statistical model, the second statistical model comprising a deep learning AI system, to determine a prediction for a field in a training document received from an entity and compare the prediction for the field to a first entry found in the training document as it was received from the entity;
   receiving, at the computer hardware processor, one or more second documents from a party;
      wherein, when the one or more second documents are in the first format, converting, using the computer hardware processor to perform OCR, the one or more second documents from the first format into the second format;
   running, using the computer hardware processor, the first deep learning AI system to determine a reliability of the party;
      when the deep learning AI system determines the party is reliable, running, using the computer hardware processor, the second deep learning AI system to determine predictions for fields in the one or more second documents and to compare the predictions for the fields to second entries found in the one or more second documents as received from the party;
         when determining that the second entries are accurate, extracting, using the computer hardware processor, data found in the one or more second documents, and populate the database;
         when determining that the second entries comprise an error, notifying, using the computer hardware processor, the party with a suggested correction to the error:
            receiving, at the computer hardware processor, feedback from the party comprising a confirmation of the suggested correction, another entry, or a reversion back to an original entry;
            storing the one or more second documents on the computer server; and
            extracting, using the computer hardware processor, data found in the one or more second documents, and populating the database;
      when the deep learning AI system determines the party is not reliable, notifying the organization to facilitate preventative measures to avoid loss to the organization.

2. The method of claim 1, wherein the step of populating the database, using the computer hardware processor, with data from the two or more first documents in the second format includes populating the database with metadata associated with the two or more first documents.

3. A method of enhancing compatibility of documents, extracting data to populate a database on a computer server, and training statistical models with data on the database, the method comprising:
   receiving, at a computer hardware processor, two or more first documents in a first format, the first format comprising a digital representation of a picture, a scan, a facsimile, or the like,
   wherein:
      the first format comprising a format that the computer hardware processor cannot use to extract data to populate the database; and
      the two or more first documents are stored on the computer server;
   converting, using the computer hardware processor to perform optical character recognition (OCR), the two or more first documents from the first format into a second format, the second format comprising a format that the computer processor can use to extract data to populate the database;
   populating, using the computer hardware processor, the database with data from the two or more first documents in the second format;
   training, using a graphics processing unit (GPU) and the database, a first statistical model, the first statistical model comprising a deep learning artificial intelligence (AI) system, to determine a reliability of a submitter of a document;
   training, using the GPU and the database, a second statistical model, the second statistical model comprising a deep learning AI system, to determine an accuracy of a first entry in a training document received from an entity;
   receiving, at the computer hardware processor, one or more second documents from a party;
   wherein:
      when the one or more second documents are in the first format, converting, using the computer hardware processor to perform OCR, the one or more second documents from the first format into the second format;
   running, using the computer hardware processor, the first deep learning AI system to determine a reliability of the party;
      when the deep learning AI system determines the party is reliable, running, using the computer hardware processor, the second deep learning AI system to determine an accuracy of second entries in the one or more second documents;
         when determining that the second entries are accurate, extracting, using the computer hardware processor, data found in the one or more second documents, and populate the database;

when determining that the second entries comprise an error, notifying, using the computer hardware processor, the party with a suggested correction to the error:
receiving, at the computer hardware processor, feedback from the party comprising a confirmation of the suggested correction, another entry, or a reversion back to an original entry;
storing the one or more second documents on the computer server; and
extracting, using the computer hardware processor, data found in the one or more second documents, and populating the database;
when the deep learning AI system determines the party is not reliable, notifying the organization to facilitate preventative measures to avoid loss to the organization.

4. The method of claim 3, further comprising:
updating the first statistical model and the second statistical model using data from the one or more second documents.

5. The method of claim 3, wherein the step of populating the database, using the computer hardware processor, with data from the two or more first documents in the second format includes populating the database with metadata associated with the two or more first documents.

6. A system for enhancing compatibility of documents, extracting data to populate a database on a computer server, and training statistical models with data on the database, the system comprising:
a computer hardware processor; and
a non-transitory computer-readable storage medium storing processor-executable instructions that, when executed by the computer hardware processor, cause the computer hardware processor to perform:
receiving, at a computer hardware processor, two or more first documents in a first format, the first format comprising a digital representation of a picture, a scan, a facsimile, or the like,
wherein:
the first format comprising a format that the computer hardware processor cannot use to extract data to populate the database; and
the two or more first documents are stored on the computer server;
converting, using the computer hardware processor to perform optical character recognition (OCR), the two or more first documents from the first format into a second format, the second format comprising a format that the computer processor can use to extract data to populate the database;
populating, using the computer hardware processor, the database with data from the two or more first documents in the second format;
training, using a graphics processing unit (GPU) and the database, a first statistical model, the first statistical model comprising a deep learning artificial intelligence (AI) system, to determine a reliability of a submitter of a document;
training, using the GPU and the database, a second statistical model, the second statistical model comprising a deep learning AI system, to determine an accuracy of a first entry in a training document received from an entity;
receiving, at the computer hardware processor, one or more second documents from a party;
wherein:
when the one or more second documents are in the first format, converting, using the computer hardware processor to perform OCR, the one or more second documents from the first format into the second format;
running, using the computer hardware processor, the first deep learning AI system to determine a reliability of the party;
when the deep learning AI system determines the party is reliable, running, using the computer hardware processor, the second deep learning AI system to determine an accuracy of second entries in the one or more second documents;
when determining that the second entries are accurate, extracting, using the computer hardware processor, data found in the one or more second documents, and populate the database;
when determining that the second entries comprise an error, notifying, using the computer hardware processor, the party with a suggested correction to the error;
receiving, at the computer hardware processor, feedback from the party comprising a confirmation of the suggested correction, another entry, or a reversion back to an original entry;
storing the one or more second documents on the computer server; and
extracting, using the computer hardware processor, data found in the one or more second documents, and populating the database;
when the deep learning AI system determines the party is not reliable, notifying the organization to facilitate preventative measures to avoid loss to the organization.

7. The system of claim 6, further comprising:
updating the first statistical model and the second statistical model using data from the one or more second documents.

8. The system of claim 6, wherein the step of populating the database, using the computer hardware processor, with data from the two or more first documents in the second format includes populating the database with metadata associated with the two or more first documents.

* * * * *